(12) United States Patent
Oh et al.

(10) Patent No.: US 11,347,240 B2
(45) Date of Patent: May 31, 2022

(54) METHOD AND APPARATUS FOR DETERMINING PATH

(71) Applicant: SAMSUNG ELECTRONICS CO., LTD., Suwon-si (KR)

(72) Inventors: Do-kwan Oh, Hwaseong-si (KR); Young-wan Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 16/524,691

(22) Filed: Jul. 29, 2019

(65) Prior Publication Data

US 2020/0110413 A1 Apr. 9, 2020

(30) Foreign Application Priority Data

Oct. 8, 2018 (KR) .................. 10-2018-0119934

(51) Int. Cl.
| | |
|---|---|
| *G05D 1/02* | (2020.01) |
| *B60W 30/16* | (2020.01) |
| *G01S 13/58* | (2006.01) |
| *G01S 13/931* | (2020.01) |

(52) U.S. Cl.
CPC ............ *G05D 1/028* (2013.01); *B60W 30/16* (2013.01); *G01S 13/58* (2013.01); *G01S 13/931* (2013.01); *G05D 1/0287* (2013.01); *B60W 2554/801* (2020.02); *G01S 2013/9325* (2013.01); *G05D 2201/0213* (2013.01)

(58) Field of Classification Search
CPC .......... G05D 1/028; G05D 2201/0213; B60W 30/16; B60W 2554/801; G01S 13/58; G01S 13/931; G01S 2013/9325
See application file for complete search history.

(56) References Cited

U.S. PATENT DOCUMENTS

| | | | |
|---|---|---|---|
| 6,356,820 B1* | 3/2002 | Hashimoto | ............... G08G 1/22 180/167 |
| 6,580,978 B1 | 6/2003 | McTamaney | |
| 7,062,381 B1* | 6/2006 | Rekow | ................... G01S 13/874 342/126 |
| 7,209,807 B2 | 4/2007 | Smith et al. | |
| 9,303,998 B2 | 4/2016 | Schmidt | |
| 9,996,080 B2 | 6/2018 | Banvait et al. | |
| 2006/0129308 A1 | 6/2006 | Kates | |
| 2007/0233337 A1* | 10/2007 | Plishner | ............... G05D 1/0295 701/23 |
| 2014/0172265 A1* | 6/2014 | Funabashi | ................ G08G 1/22 701/96 |
| 2018/0041849 A1 | 2/2018 | Farmani et al. | |

(Continued)

FOREIGN PATENT DOCUMENTS

| | | |
|---|---|---|
| JP | 2005-309596 A | 11/2005 |
| JP | 2016-115207 A | 6/2016 |
| KR | 10-0858926 B1 | 9/2008 |

(Continued)

*Primary Examiner* — Jelani A Smith
*Assistant Examiner* — Hana Lee
(74) *Attorney, Agent, or Firm* — Sughrue Mion, PLLC

(57) ABSTRACT

Provided is a method and apparatus for determining a path of a vehicle. The method includes receiving a radio frequency (RF) signal among RF signals predefined corresponding to other vehicles in front of the vehicle, and determining a path of the vehicle based on the received RF signal.

16 Claims, 9 Drawing Sheets

(56) References Cited

U.S. PATENT DOCUMENTS

2019/0272760 A1* 9/2019 McQuillen ............ G08G 1/0968

FOREIGN PATENT DOCUMENTS

| KR | 10-0991478 B1 | 11/2010 | | |
|---|---|---|---|---|
| KR | 10-2011-0105926 A | 9/2011 | | |
| KR | 10-1739262 B1 | 5/2017 | | |
| WO | WO-2010137135 A1 * | 12/2010 | ............. | G08G 1/161 |
| WO | WO-2017105319 A1 * | 6/2017 | .......... | B60W 30/165 |

* cited by examiner

FIG. 1
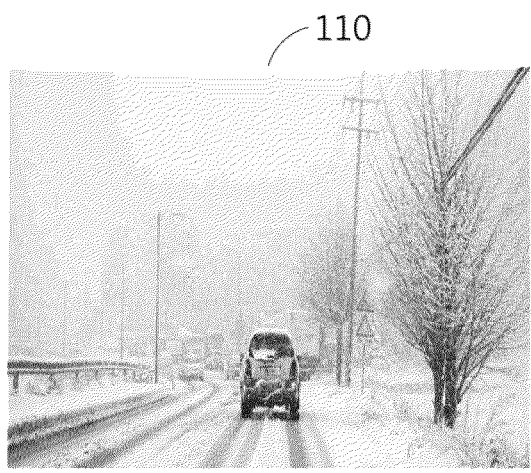
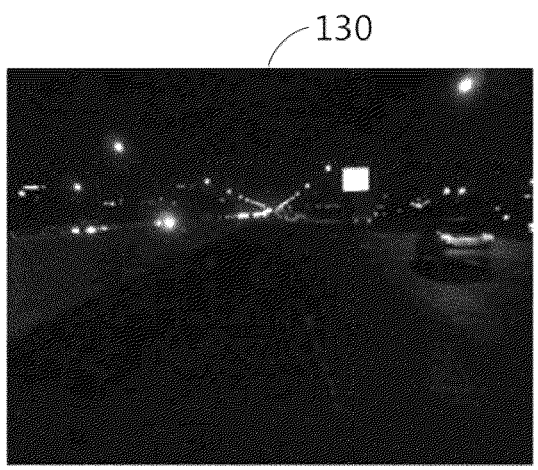
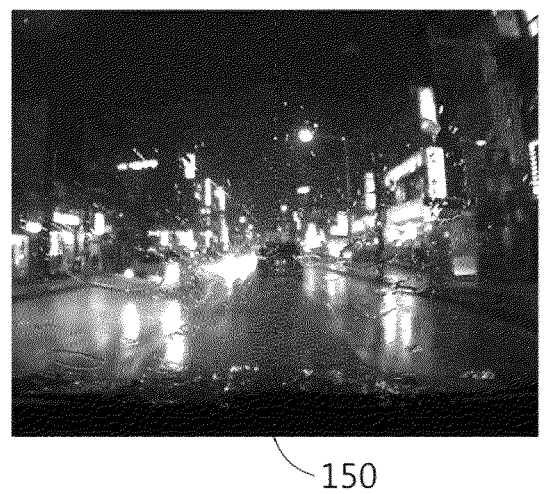

METHOD AND APPARATUS FOR DETERMINING PATH

CROSS-REFERENCE TO RELATED APPLICATION

This application is based on and claims priority from Korean Patent Application No. 10-2018-0119934, filed on Oct. 8, 2018, in the Korean Intellectual Property Office, the disclosure of which is incorporated herein in its entirety by reference.

BACKGROUND

The disclosure relates to a method and apparatus for determining a path for a vehicle.

Various visual information augmentations for assisting steering of vehicles and other transportation means have been provided. Among them, various methods of extracting lane marking, road information, etc., from a driving image may be used. As such, when a path is set using visual information obtained from the driving image, or steering assisting information is generated, the performance of a function may largely depend on whether a target object (e.g., a vehicle and/or a lane, etc.) is clearly identified or a location thereof is accurately identified. For example, when the target object is occluded by various objects in a road environment or the target object is unidentifiable from the driving image due to bad weather such as snow, heavy rain, a typhoon, etc., a trouble may occur in providing correct information for driving a vehicle such as for controlling the vehicle, determining a path, and so forth.

SUMMARY

According to an aspect of the disclosure, there is provided a method of determining a path, performed by a path determining apparatus in a first vehicle, the method comprising: receiving a radio frequency (RF) signal, among a plurality of RF signals corresponding to a plurality of front vehicles that are in front of the first vehicle; and determining a path of the first vehicle based on the received RF signal.

According to another aspect of the disclosure, there is provided an apparatus in a first vehicle for determining a path of the first vehicle, the apparatus comprising: a receiver configured to receive a radio frequency (RF) signal, among RF signals corresponding to a plurality of front vehicles that are in front of the first vehicle; and a processor configured to determine a path of the first vehicle based on the received RF signal.

BRIEF DESCRIPTION OF THE DRAWINGS

One or more embodiments of the disclosure will be more clearly understood from the following detailed description taken in conjunction with the accompanying drawings in which:

FIG. 1 is a view for describing a situation where a method of determining a path is used, according to an embodiment;

DETAILED DESCRIPTION OF THE EMBODIMENTS

Figure 2A:
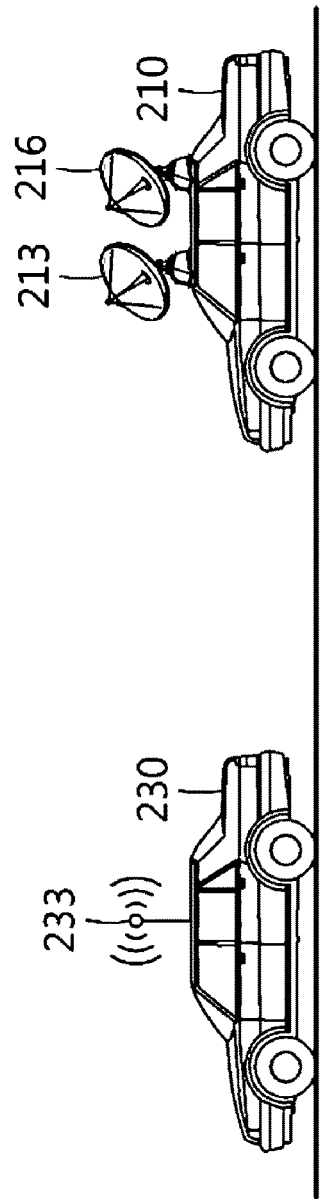
FIGS. 2A and 2B illustrate is a view for describing a method of determining a path, according to an embodiment.

Hereinafter, embodiments of the disclosure will be described in detail with reference to the accompanying drawings. However, the scope of the disclosure is not restricted by or limited to these embodiments Like reference numerals indicated in the drawings refer to like members.

Various changes may be applied to embodiments described below. However, the embodiments described below are not construed as limited to embodiment forms, and include all changes, equivalents, or substitutes thereof.

The terms used in the embodiments are for the purpose of describing the particular embodiments only and are not intended to limit the embodiments. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

All of the terms used herein including technical or scientific terms have the same meanings as those generally understood by an ordinary skilled person in the related art of the embodiments unless they are defined other. The terms defined in a generally used dictionary should be interpreted as having meanings that are the same as or similar with the contextual meanings of the relevant technology and should not be interpreted as having ideal or exaggerated meanings unless they are clearly defined in the embodiments.

Hereinafter, embodiments will be disclosed in detail with reference to the accompanying drawings Like reference numerals indicated in the drawings refer to like members.

FIG. 1 is a view for describing a situation where a method of determining a path is used, according to an embodiment. Referring to FIG. 1, driving images 110, 130, and 150 obtained in different driving environments are illustrated. The driving image 110 is an image obtained on a snowy day, and the driving image 130 is an image obtained at dark night. The driving image 150 is an image obtained on a rainy day.

To calculate information for driving and/or assisting driving or determine a path in a vehicle, various information obtained from a driving image (e.g., vision information) may be used. For example, when a driving image is obtained on a clear day, a lane of a road, a traveling direction of the vehicle or nearby vehicles thereof, etc., are clearly expressed in the driving image. In this case, by using information obtained from the driving image, a path of the vehicle may be set or control information for driving and/or driving assistance information may be generated.

On the other hand, when a driving image is obtained under a bad weather condition such as clouds, snow, rain, fog, etc., like the driving image 110 and/or the driving image 150 or at dark night like the driving image 130, it is impossible to recognize a nearby vehicle as well as a lane ahead on the road from the obtained driving image. In addition, when many vehicles are complicatedly entangled ahead or a lane is difficult to identify because of being covered by shadows, the lane and/or a nearby vehicle may not be easy to accurately recognize.

As a result, when a lane and/or a vehicle is difficult to identify from the driving image as stated above, it may be impossible to determine a vehicle's path or driving information and/or driving assistance information by using the driving image.

Figure 2B:
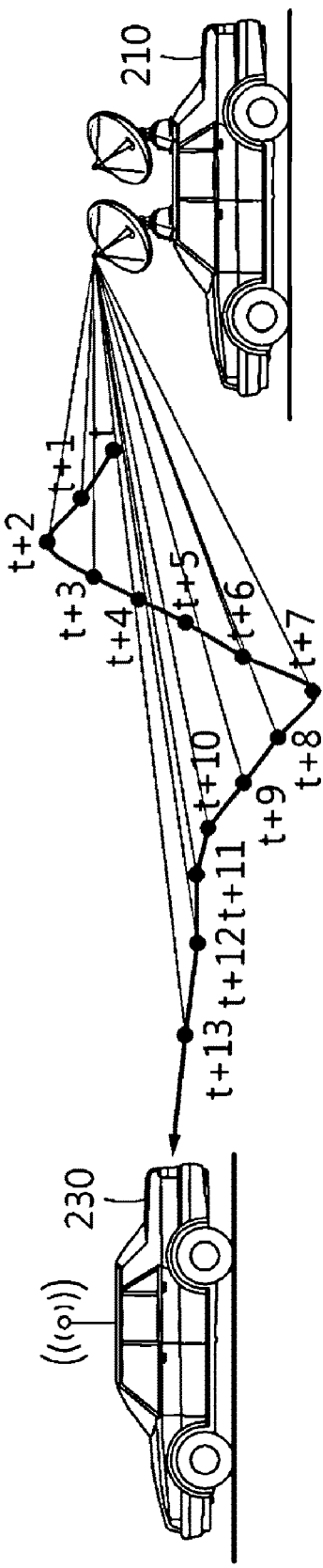

FIGS. 2A and 2B illustrate a view for describing a method of determining a path, according to an embodiment. Referring to FIG. 2A, a self-vehicle 210 and a front vehicle 230 are illustrated.

Herein, the 'self-vehicle' may mean a vehicle traveling on a road and include, for example, an autonomous vehicle, an intelligent vehicle including an advanced driver assistance system (ADAS), and so forth. The 'front vehicle(s)' may mean a vehicle that travels on the same road as the self-vehicle within a specific distance from the self-vehicle in front of the self-vehicle. Herein, the specific distance may be a distance in which the self-vehicle may smoothly receive a radio frequency (RF) signal transmitted from the front vehicle. The specific distance may differ with capabilities of a transmitter of the front vehicle and capabilities of receivers of the self-vehicle. RF signals may include different frequencies for different front vehicles. According to an embodiment, the RF signal(s) may include information about the time at which the front vehicle(s) transmits the RF signal(s). The RF signal may also be referred to as a 'radio signal'. The self-vehicle 210 and the front vehicle 230 travel on the same lane or different lanes on the same road.

As stated with reference to FIG. 1, when a lane and/or a vehicle is difficult to identify from a driving image, it may be impossible to determine a vehicle's path or driving information and/or driving assistance information by using the driving image. Thus, in an embodiment, a path of the self-vehicle 210 may be determined by tracking the front vehicle 230 or a path thereof. The front vehicle 230 may be a target (or a tracking source) for tracking a path. In this case, path tracking for the front vehicle 230 may be performed using an RF signal to be transmitted by the front vehicle 230, which is predefined corresponding to the front vehicle 230. An apparatus for determining a path according to an embodiment may be embedded in the self-vehicle 210 or may be coupled with the self-vehicle 210 through a separate docker. The apparatus for determining a path may be, for example, a mobile device such as a smartphone, a user terminal in various forms, or a separate device.

Hereinbelow, for convenience, assuming that the apparatus for determining a path is embedded or included in the self-vehicle 210, an operation of the apparatus for determining a path will be described as an operation of the self-vehicle 210.

The self-vehicle 210 may include two receivers 213 and 216 for tracking a position of the front vehicle 230. The two receivers 213 and 216 may be included in the self-vehicle 210 or may be included in the apparatus for determining a path according to an embodiment. The two receivers 213 and 216 may receive a predefined RF signal transmitted from the front vehicle 230 through a transmitter 233. According to an embodiment, at least one of the two receivers 213 and 216 may be included in a user device (e.g., a smartphone) of a user getting on the self-vehicle 210. The front vehicle 230 may include one transmitter 233. According to an embodiment, the transmitter 233 may be included in a user device of a user getting on the front vehicle 230.

The self-vehicle 210 may calculate (or predict) an azimuth between the self-vehicle 210 and the front vehicle 230 through a cross-correlation computation with respect to the received RF signal. The self-vehicle 210 may calculate a distance between the self-vehicle 210 and the front vehicle 230 by tracking attenuation of the RF signal received from the front vehicle 230. A method of calculating the azimuth and the distance between the self-vehicle 210 and the front vehicle 230 in an embodiment will be described in detail with reference to FIG. 8.

Referring to FIG. 2B, the self-vehicle 210 may recognize a trajectory of the front vehicle 230 by calculating the distance and the azimuth between the self-vehicle 210 and the front vehicle 230 and determine a trajectory of the self-vehicle 210 without additional information by following the front vehicle 230.

The self-vehicle 210 may determine a local path thereof in a poor-visibility situation by tracking a trajectory of a nearby object (e.g., the front vehicle 230) based on the azimuth and the distance calculated using the RF signal transmitted from the front vehicle 230 as described above. The self-vehicle 210 may reduce a memory usage and process loading of the self-vehicle 210 (or the apparatus for determining a path) by determining the path of the self-vehicle 210 using the RF signal transmitted from the front vehicle 230, without a need to receive information about a road condition, a traffic condition, a surrounding condition, etc., through vehicle-to-everything (V2X), vehicle-to-vehicle (V2V), etc.

Moreover, according to an embodiment, by using the azimuth and the distance, collision avoidance and other driving assistance may be smoothly performed even in a situation where vision information obtained from a driving image is not clear or the vision information is difficult to obtain from the driving image because a target object is covered by shadows or multiple nearby objects.

According to an embodiment, a result of tracking the trajectory of the front vehicle 230 by using the RF signal, the azimuth and the distance calculated using the RF signal, and so forth may be used together with the vision information obtained from the driving image, without excluding the use of the vision information obtained from the driving image.

Figure 3:
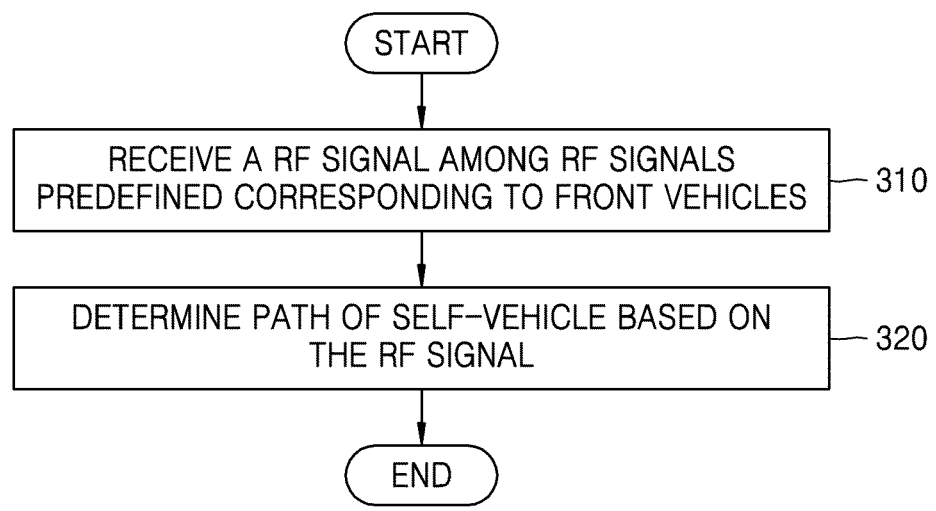
FIG. 3 is a flowchart illustrating a method of determining a path, according to an embodiment.

FIG. 3 is a flowchart illustrating a method of determining a path, according to an embodiment. Referring to FIG. 3, the apparatus for determining a path (hereinafter, the 'path determining apparatus') according to an embodiment may receive an RF signal, among predefined RF signals, corresponding to front vehicles in operation 310. Each front vehicle may include one transmitter and may transmit a predefined RF signal corresponding thereto through the transmitter. The path determining apparatus may include a first receiver and a second receiver. Each of the first receiver and the second receiver may receive the RF signal. An RF signal may have been transmitted from any one front vehicle selected by a user from among multiple front vehicles near the self-vehicle or determined (selected) by the path determining apparatus, based on at least one of position information of the front vehicles or path information of the front vehicles.

The path determining apparatus may determine any one front vehicle to be tracked for determining the path of the self-vehicle from among the front vehicles and receive an RF signal from the determined front vehicle. The path determining apparatus may determine any one front vehicle to be tracked, by using at least one of the position information of the front vehicles and the path information of the front vehicles, and receive the RF signal from the determined front vehicle. The position information of the front vehicle(s) may include the distance between the front vehicle(s) and the self-vehicle and the azimuth between the front vehicle(s) and the self-vehicle. The path information of the front vehicle(s) may include information about a global path obtained from a navigator of each of the front vehicles(s). The path information of the front vehicle(s) may include, for example, a final destination, an intermediate pathway, an intermediate stop, a traveling direction, etc., of the front vehicle(s).

According to an embodiment, the front vehicle(s) may include a transportation in the form of a group such as a plurality of transport trucks for transportation to the same destination or a plurality of commuter buses (school buses) for transportation at specific intervals along the same route as well as individual transportation means, e.g., a taxi, a car, a truck, etc.

In operation 320, the path determining apparatus may determine the path of the self-vehicle based on the RF signal received in operation 310. The path determining apparatus may calculate position information of the front vehicle corresponding to the any one RF signal based on the any one RF signal, and determine the path of the self-vehicle based on the position information of the front vehicle. A method, performed by the path determining apparatus, of calculating the position information of the front vehicle will be described later with reference to FIG. 8.

Embodiments to be described below may be used to display a lane or a carriageway, generate visual information for assisting steering of an autonomous vehicle, or provide various control information for driving a vehicle in an augmented reality (AR) navigation system such as a smart vehicle, etc. The embodiments may also be used to help safe and pleasant driving by providing visual information to a device including an intelligent system such as a head up display (HUD), etc., mounted in a vehicle for driving assistance or fully autonomous driving. The embodiments are applicable to, for example, an autonomous vehicle, an intelligent vehicle, a smartphone, a mobile device, etc.

Herein, a 'road' may mean a road on which vehicles travel and may include various types of roads such as a highway, a national highway, a local road, a national expressway, a motorway, etc. The road may include one lane or multiple lanes. The 'lane' may correspond to a road space defined by lines marked on the road surface. The lane may be defined by left and right lines (lane boundaries) adjacent to the lane. The 'line' may be understood as various types of lines such as a solid line, a dotted line, a curved line, a zigzag line, etc., marked in white, blue, or yellow on the road surface. The line may correspond to a line at a side for defining one lane or a pair of lines, i.e., a left line and a right line for defining one lane.

Figure 4:
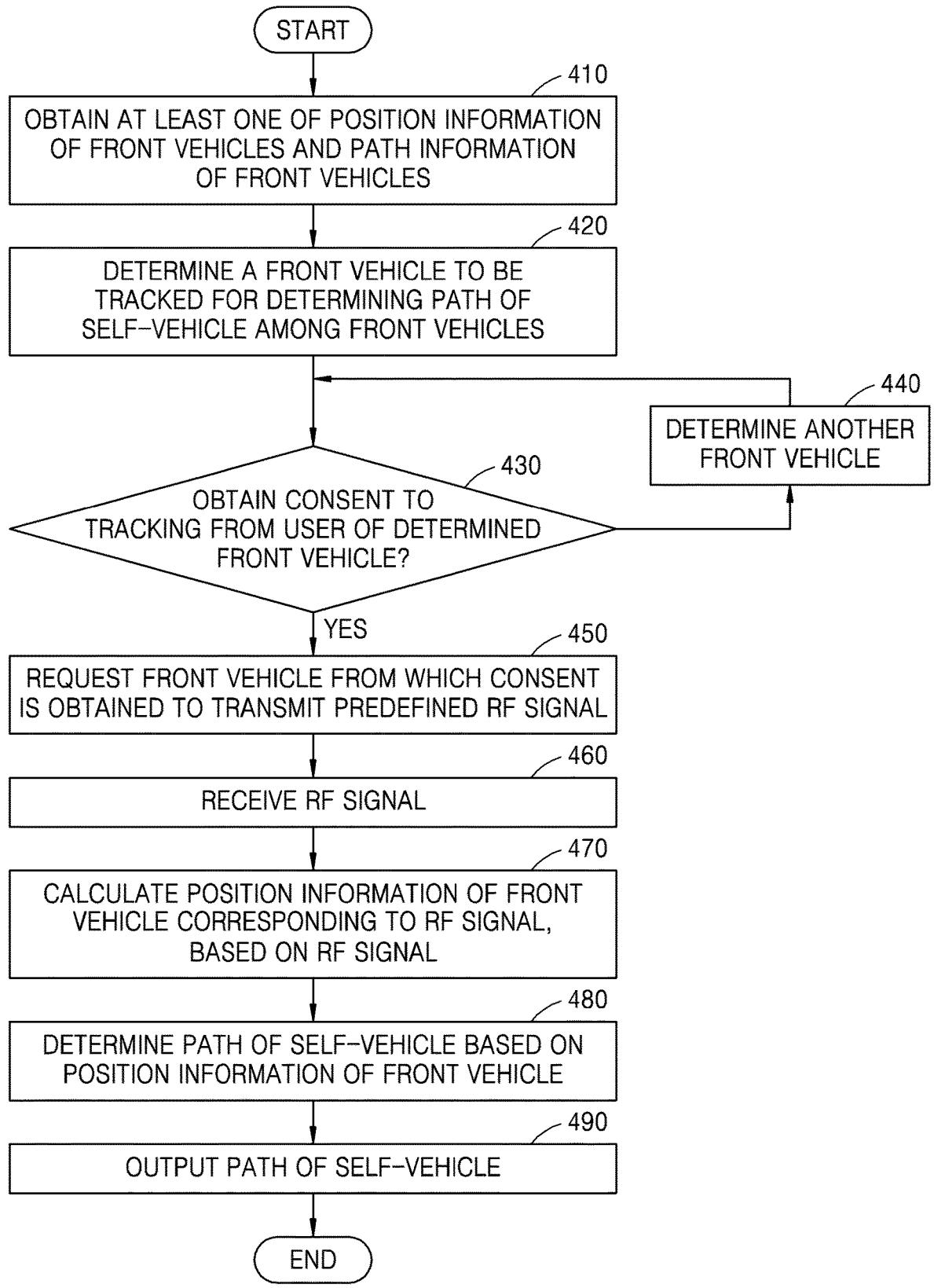
FIG. 4 is a flowchart illustrating a method of determining a path, according to another embodiment.

FIG. 4 is a flowchart illustrating a method of determining a path, according to another embodiment. Referring to FIG. 4, the path determining apparatus according to an embodiment may obtain at least one of position information of front vehicles and path information of the front vehicles in operation 410.

The path determining apparatus may determine a front vehicle to be tracked for determining a path of the self-vehicle from among the front vehicles in operation 420. A method for the path determining apparatus to determine the front vehicle to be tracked will later be described in detail with reference to FIG. 5.

In operation 430, the path determining apparatus may obtain consent to tracking from a user of the any one front vehicle determined in operation 420. The consent to tracking may include, for example, consent to use position information and path information of the front vehicle.

If the path determining apparatus does not obtain the consent to tracking the determined front vehicle in operation 430, the path determining apparatus may determine another front vehicle from among the front vehicles other than the determined front vehicle in operation 440. The path determining apparatus may perform a subsequent process after the path determining apparatus obtains the consent to tracking from the user of the determined other front vehicle in operation 430.

When the path determining apparatus obtains the consent to tracking in operation 430, the path determining apparatus may request the front vehicle from which the consent is obtained to transmit a predefined RF signal in operation 450.

In operation 460, the path determining apparatus may receive the RF signal requested to be transmitted in operation 450. The path determining apparatus may calculate position information of the front vehicle corresponding to the received RF signal based on the received RF signal in operation 470.

The path determining apparatus may determine a path of the self-vehicle based on the position information of the front vehicle in operation 480.

The path determining apparatus may output the path of the self-vehicle in operation 490. The path determining apparatus may output the path of the self-vehicle together with, for example, map information obtained from the path information of the front vehicles. The path determining apparatus may output the path of the self-vehicle on a display (970 of FIG. 9) or output the same to the outside thereof through a communication interface (990 of FIG. 9).

Figure 5:
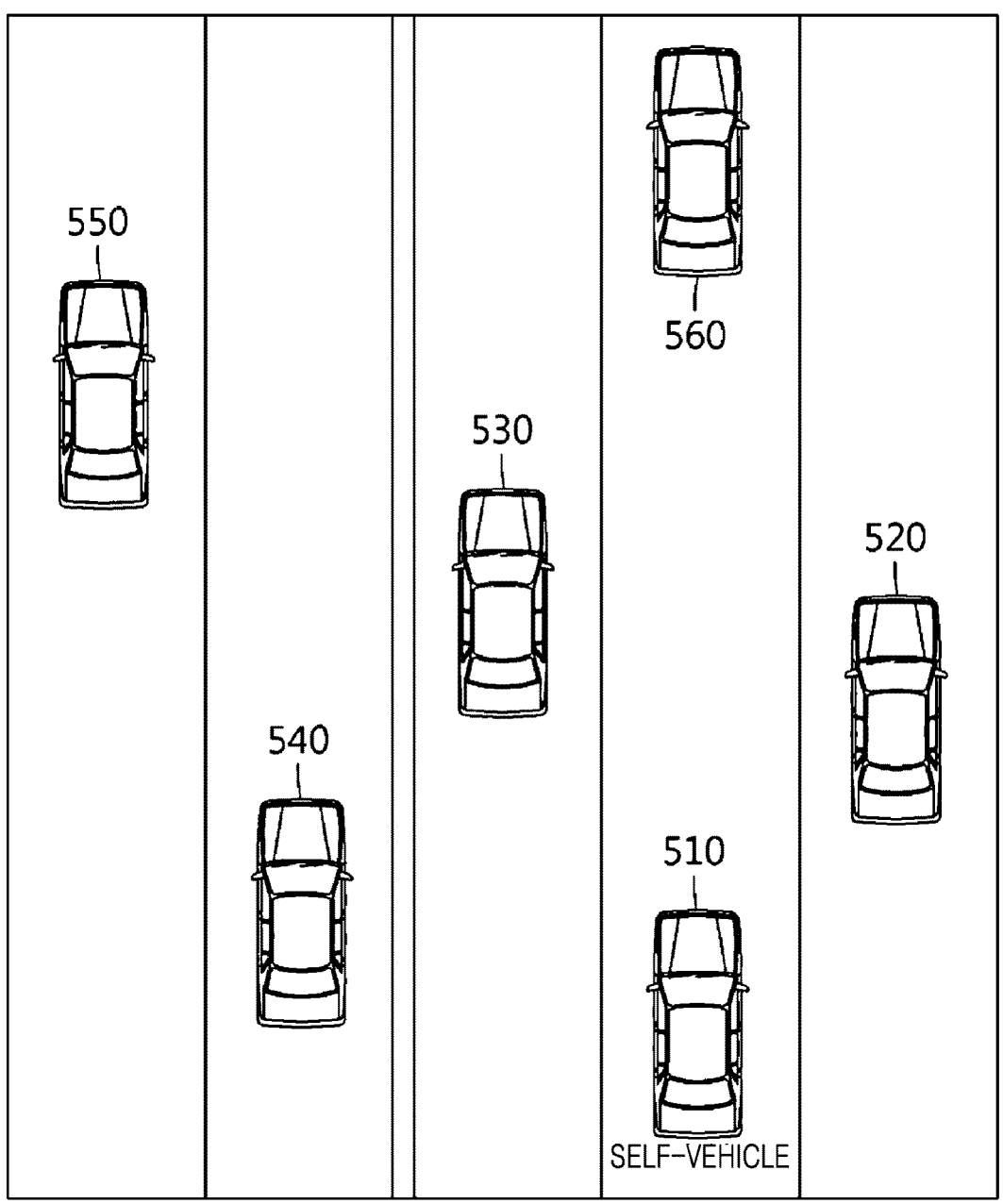
FIG. 5 is a diagram for describing a method of determining any one front vehicle, according to an embodiment.

FIG. 5 is a diagram for describing a method of determining a front vehicle, according to an embodiment. Referring to FIG. 5, a self-vehicle 510 and front vehicles 520, 530, 540, 550, and 560 are illustrated.

The self-vehicle 510 may determine a front vehicle to be tracked to determine a path of the self-vehicle 510 from among the front vehicles 520, 530, 540, 550, and 560 by using at least one of position information of the front vehicles 520, 530, 540, 550, and 560 and path information of the front vehicles 520, 530, 540, 550, and 560.

The self-vehicle 510 may search in the path information obtained from the front vehicles 520, 530, 540, 550, and 560 for a front vehicle(s) having the same final destination as the self-vehicle 510 or having the same intermediate stop as the self-vehicle 510 in spite of having a different final destination. For example, it may be assumed that the self-vehicle 510 has a final destination of 'Daegu', the front vehicle 520 has a final destination of 'Daejeon', the front vehicle 530 has a final destination of 'Busan', the front vehicle 540 has a final destination of 'Daegu', the front vehicle 550 has a final destination of 'Gwangju', and the front vehicle 560 has a final destination of 'Mokpo'.

The self-vehicle 510 may determine the front vehicle 540 having the same final destination 'Daegu' among the front vehicles 520, 530, 540, 550, and 560 as a front vehicle to be tracked for determining a path of the self-vehicle 510.

The self-vehicle 510 may determine, as a front vehicle (or a front vehicle candidate) to be tracked, the front vehicle 520 having the final destination 'Daejeon' that is the intermediate stop to the final destination of the self-vehicle 510 even though the final destination is different from that of the self-vehicle 510, aside from the front vehicle 540 having the same final destination 'Daegu'. The self-vehicle 510 may determine, as a final front vehicle to be tracked, the front vehicle 520 having the position information from which it may be known that the front vehicle 520 is closer to the self-vehicle 510 than the front vehicle 540.

According to an embodiment, the self-vehicle 510 may determine, as a front vehicle (or front vehicle candidate) to be tracked, one of the front vehicles 520, 530, and 560 that are within a specific distance from the self-vehicle 510 (e.g., apart by one line from the self-vehicle 510 to the left and right) and/or within a specific azimuth from the self-vehicle 510 (e.g., an azimuth of 30 degrees from the self-vehicle 510), based on the position information of the front vehicles 520, 530, 540, 550, and 560. Based on the path information of the front vehicles 520, 530, and 560, the self-vehicle 510 may determine the front vehicle 520 as the final front vehicle to be tracked, when the front vehicles 520, 530, or 560 has the same final destination as the final destination 'Daegu' of the self-vehicle 510 or has the same final destination as the intermediate stop 'Daejeon' in which the self-vehicle 510 has to stop. Thereafter, the self-vehicle 510 may determine the path thereof to follow the front vehicle 520, based on the position information of the front vehicle 520. The self-vehicle 510 may also generate a driving control parameter and/or control driving thereof based on the driving control parameter such that the self-vehicle 510 may avoid deviating from the front vehicle 520 by a preset distance (e.g., 30 m or 50 m) and/or a preset azimuth (e.g., 25 degrees).

In an embodiment, the self-vehicle 510 may use any one of the position information and the path information of the front vehicles first to determine a front vehicle to be tracked or may use only one of them or both of them.

According to an embodiment, the self-vehicle 510 may determine, as a final front vehicle to be tracked, a front vehicle having an average driving speed that is similar to that of the self-vehicle 510 among the front vehicles 520, 530, and 560 determined as the front vehicle candidates to be tracked.

The self-vehicle 510 according to an embodiment may determine the final front vehicle to be tracked, by combining various information such as the position information of the front vehicles, (average) driving speeds of the front vehicles, and so forth as well as the final destinations, the intermediate pathways, the intermediate stops, and the traveling directions included in the path information of the front vehicles.

Figure 6:
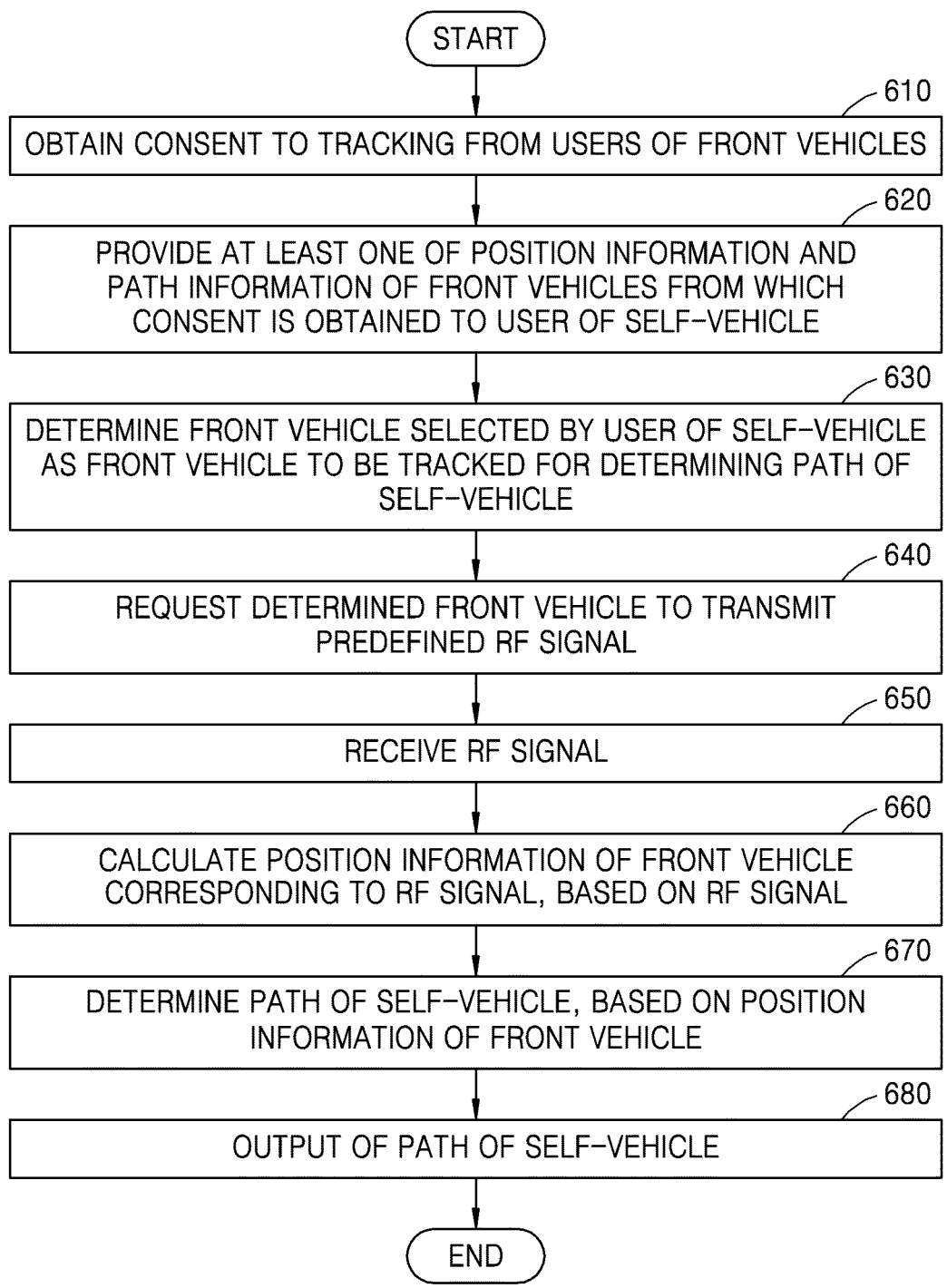
FIG. 6 is a flowchart illustrating a method of determining a path, according to another embodiment.

FIG. 6 is a flowchart illustrating a method of determining a path, according to another embodiment. Referring to FIG. 6, the path determining apparatus according to an embodiment may obtain consent to tracking from users of front vehicles in operation 610. The consent to tracking may include, for example, consent to the use of position information and path information of the front vehicles.

The path determining apparatus may provide at least one of the position information and the path information of the front vehicles for which the consent to tracking has been obtained to a user of the self-vehicle in operation 620.

The path determining apparatus may determine a front vehicle selected from the user of the self-vehicle based on the providing in operation 620 as the any one front vehicle in operation 630. A method of determining the front vehicle selected by the user of the self-vehicle as the any one front vehicle will later be described in detail with reference to FIG. 7.

The path determining apparatus may request the front vehicle determined in operation 630 to transmit a predefined RF signal in operation 640. A description of operations 650 through 680 will refer to that of operations 460 through 490 of FIG. 4 because operations 650 through 680 are identical to operations 460 through 490.

Figure 7:
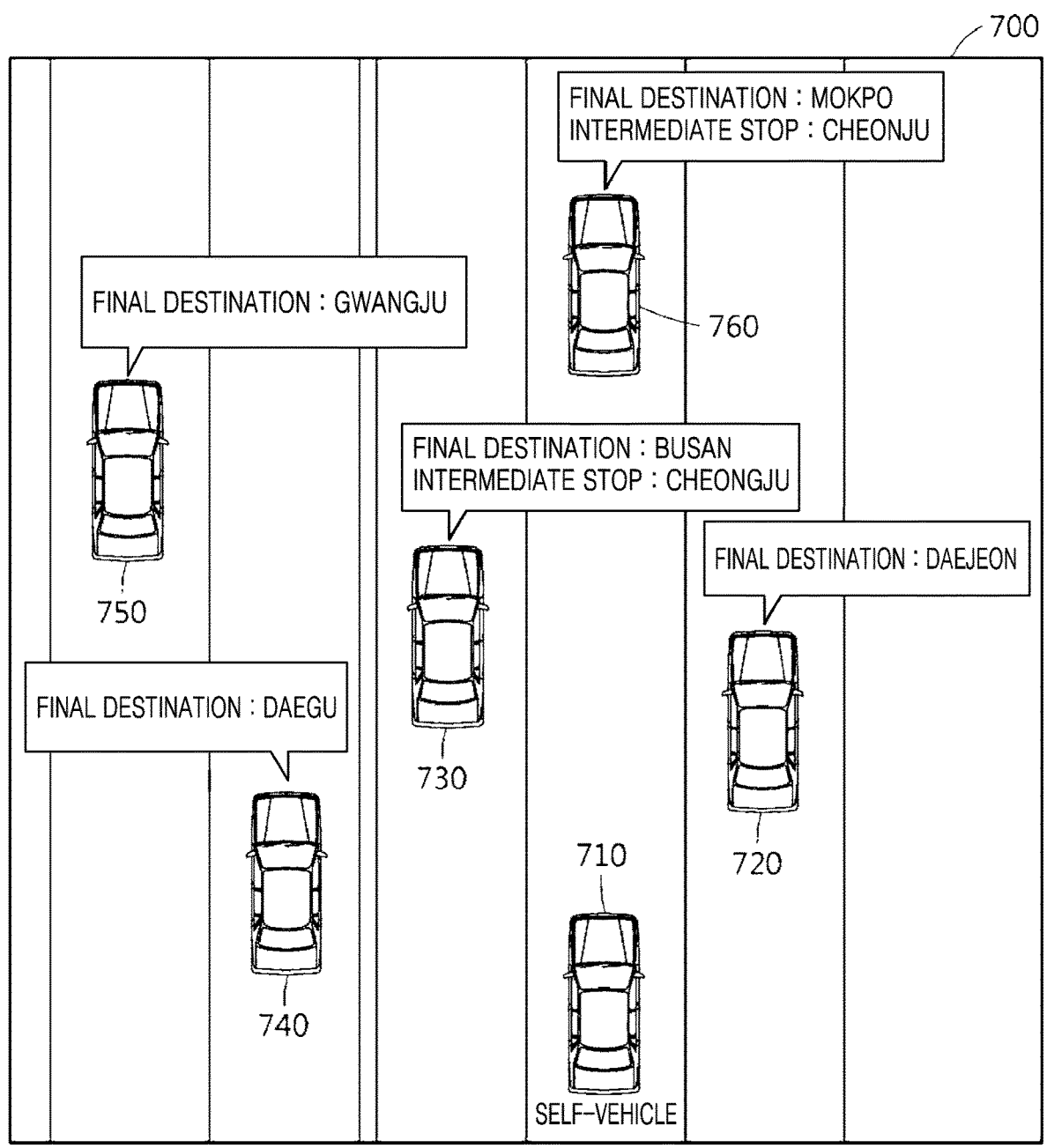
FIG. 7 is a diagram for describing a method of determining any one front vehicle, according to another embodiment.

FIG. 7 is a diagram for describing a method of determining a front vehicle, according to another embodiment. Referring to FIG. 7, a screen 700 provided to a user of a self-vehicle 710 through a display of the self-vehicle 710 (or a display (970 of FIG. 9) of the path determining apparatus) is illustrated. On the screen 700, positions of the self-vehicle 710 and front vehicles 720, 730, 740, 750, and 760 and path information of the front vehicles 720, 730, 740, 750, and 760 may be displayed. The path information of the front vehicles 720, 730, 740, 750, and 760 obtained by the self-vehicle 710 may correspond to global paths of the front vehicles 720, 730, 740, 750, and 760, which are recognized by the front vehicles 720, 730, 740, 750, and 760 or navigators thereof, etc. The positions of the front vehicles 720, 730, 740, 750, and 760 may have been determined based on, for example, Equation (1) and Equation (2) provided below.

For example, it is assumed that the front vehicle 720 has a final destination of 'Daejeon', the front vehicle 730 has a final destination of 'Busan' and an intermediate stop of 'Cheongju', and the front vehicle 740 has a final destination of 'Daegu'. It is also assumed that the front vehicle 750 has a final destination of 'Gwangju' and the front vehicle 760 has a final destination of 'Mokpo' and an intermediate stop of 'Cheongju'. Path information of the front vehicles 720, 730, 740, 750, and 760 may be provided to the user as in the screen 700. The self-vehicle 710 may have obtained the path information of the front vehicles 720, 730, 740, 750, and 760 by getting consent to tracking from the front vehicles 720, 730, 740, 750, and 760.

The user of the self-vehicle 710 may determine a front vehicle to be tracked to determine a path of the self-vehicle 710, based on the path information of the front vehicles 720, 730, 740, 750, and 760 provided through the screen 700. The user of the self-vehicle 710 may determine the front vehicle 720 as the front vehicle to be tracked, for example, by touching the front vehicle 720 displayed on the screen 700 or saying, for example, "select the front vehicle 720".

When the user of the self-vehicle 710 selects the front vehicle 720 as the front vehicle to be tracked, a path of the self-vehicle 710 determined by tracking a path of the front vehicle 720 may be displayed on the screen 700.

Figure 8:
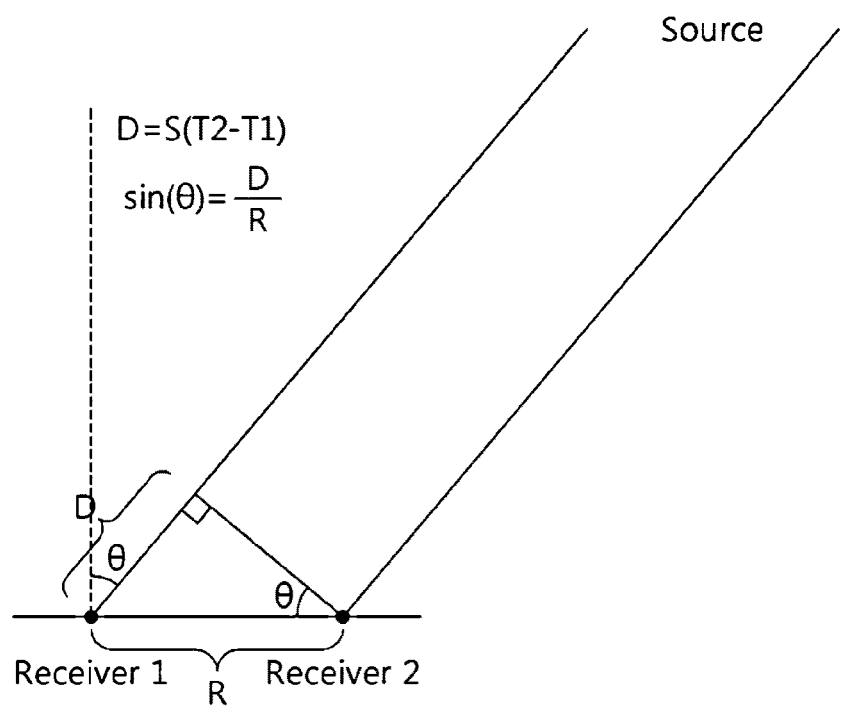
FIG. 8 is a view for describing a method of calculating position information of a front vehicle, according to an embodiment.

FIG. 8 is a view for describing a method of calculating position information of a front vehicle, according to an embodiment. Referring to FIG. 8, a distance R between two receivers, a first receiver (Receiver 1) and a second receiver (Receiver 2), included in a self-vehicle, and a difference D between a first distance and a second distance are shown in which the first distance is a distance between a front vehicle and the first receiver and the second distance is a distance between the front vehicle and the second receiver.

In an embodiment, assuming that the front vehicle (Source) is sufficiently far from (the receivers of) the self-vehicle and a path from the front vehicle to the first receiver and a path from the front vehicle to the second receiver are parallel with each other, the difference D between the first distance and the second distance may be calculated using:

$$D = S(T2 - T1) \tag{1}$$

where T1 indicates a time required for an RF signal transmitted from the front vehicle to arrive at the first receiver, and T2 indicates a time required for the RF signal transmitted from the front vehicle to arrive at the second receiver. S indicates a transmission speed of the RF signal.

In this case, (T2−T1) may be predicted using a correlation scheme for measuring a time shift that makes signals received, for example, by two receivers, similar to each other. A predefined RF signal used in an embodiment may be easy to predict because the predefined RF signal is easy to be time-shifted when compared to an arbitrary sound signal has a low possibility of being attenuated depending on a condition of a signal delivery path when compared to the sound signal.

The path determining apparatus may also calculate an azimuth θ between the front vehicle and the self-vehicle using:

$$\text{Azimuth}(\theta) = \arcsin(D/R) \quad (2),$$

where R indicates a distance between the two receivers of the self-vehicle.

The path determining apparatus may calculate an azimuth between the front vehicle having transmitted the RF signal and the self-vehicle, based on the difference D between the first distance and the second distance and the distance R between the first receiver and the second receiver.

The path determining apparatus may calculate the distance between the self-vehicle and the front vehicle by tracking attenuation of the RF signal received from the front vehicle.

The path determining apparatus may calculate position information of the front vehicle corresponding to the RF signal based on the difference D, the azimuth θ, and the distance between the self-vehicle and the front vehicle. The path determining apparatus may determine a path of the self-vehicle based on the position information of the front vehicle.

The path determining apparatus may recognize a moving path of the front vehicle by calculating (or measuring) a distance and an azimuth between the self-vehicle and the front vehicle, calculated using Equation (1) and Equation (2), at specific time intervals (e.g., of 1 minute, 5 minutes, 10 minutes, or 30 minutes).

In this way, by following the moving path of the front vehicle, the path determining apparatus may determine the path of the self-vehicle even when the front vehicle or a lane is not visible, thus enabling safe driving of the self-vehicle.

According to an embodiment, the path determining apparatus may determine the path of the self-vehicle by recognizing the moving path of the front vehicle using various path tracking sources such as tracking of an engine sound of the front vehicle, tracking of an exhaust gas of the front vehicle, tracking of engine heat of the front vehicle, as well as the predefined RF signal.

Figure 9:
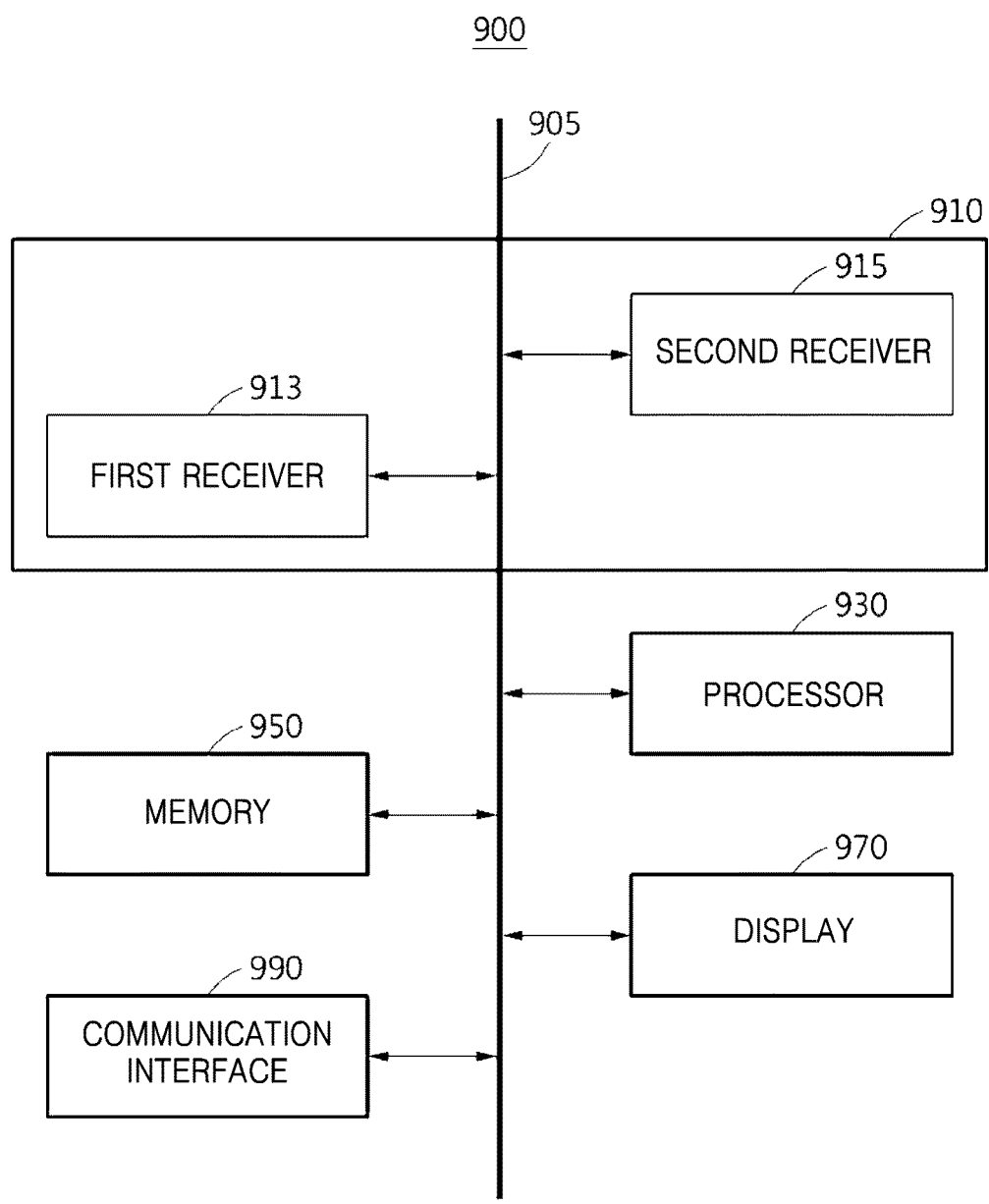
FIG. 9 is a block diagram of an apparatus for determining a path, according to an embodiment.

FIG. 9 is a block diagram of an apparatus for determining a path according to an embodiment. Referring to FIG. 9, a path determining apparatus 900 according to an embodiment may include a receiver 910 and a processor 930. The receiver 910 may include a first receiver 913 and/or a second receiver 915. The path determining apparatus 900 may also include a memory 950, a display 970, and a communication interface 990. The first receiver 913, the second receiver 915, the processor 930, the memory 950, the display 970, and the communication interface 990 may communicate with one another through a communication bus 905.

The first receiver 913 and the second receiver 915 may receive an RF signal, among RF signals corresponding to front vehicles. According to an embodiment, the RF signals are predefined. The first receiver 913 and the second receiver 915 may be separated apart from each other by the distance R described above with reference to FIG. 8.

According to an embodiment, the processor 930 may receive the RF signal received by the first receiver 913 and the second receiver 915 through the communication interface 990, and determine the path of the self-vehicle based on the any one RF signal.

The processor 930 may determine a front vehicle to be tracked for determining a path of the self-vehicle from among the front vehicles. The processor 930 may determine the any one front vehicle to be tracked, by using at least one of position information of a front vehicle(s) and path information of a front vehicle(s). The position information of the front vehicle(s) may have been calculated by the path determining apparatus based on an RF signal(s) transmitted from the front vehicle(s). The path information of the front vehicle(s) may have been obtained by the processor 930 from the outside of the path determining apparatus 900 through the communication interface 990. The first receiver 913 and the second receiver 915 may receive an RF signal from the any one front vehicle determined by the processor 930.

The processor 930 may calculate position information of the determined front vehicle based on the RF signal received from the determined front vehicle and determine the path of the self-vehicle based on the position information of the front vehicle.

The processor 930 may perform at least one method described above with reference to FIGS. 1 through 8 or an algorithm corresponding to the at least one method. The processor 930 may be a data processor implemented as hardware including a circuit having a physical structure for executing desired operations. For example, the desired operations may include code or instructions included in a program. For example, examples of the data processor implemented as hardware may include a microprocessor, a central processing unit, a processor core, a multi-core processor, a multiprocessor, an application-specific integrated circuit (ASIC), a field programmable gate array (FPGA), and so forth.

The processor 930 may execute a program and control the path determining apparatus 900. Program code executed by the processor 930 may be stored in the memory 950.

Any one RF signal received by the first receiver 913 and the second receiver 915 may be stored in the memory 950. A self-vehicle's path determined by the processor 930 may be stored in the memory 950. Position information and/or path information of a front vehicle(s) calculated by the path determining apparatus 900 may be stored in the memory 950.

Various information generated in the above-described operations of the processor 930 may also be stored in the memory 950. In addition, various data and programs may be stored in the memory 950. The memory 950 may include a volatile and/or nonvolatile memory. The memory 950 may include a large-capacity storage medium such as a hard disk, etc., for storage of various data therein.

The path of the self-vehicle determined by the processor 930 may be output on a screen of the display 970.

The path of the self-vehicle determined by the processor 930 may be output to the outside of the path determining apparatus 900 through the communication interface 990. The path information of the front vehicles may be obtained from the outside of the path determining apparatus 900 through the communication interface 990.

The methods according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. Further, examples of the program instructions include machine language code created by a compiler and high-level language code executable by a computer using an interpreter. The foregoing hardware device may be configured to be operated as at least one software module to perform an operation of the embodiments, or vice versa.

While the embodiments have been described in connection with specific drawings, a person skilled in the art would apply various technical modifications and changes based on the forgoing description. For example, even when described techniques are performed in a sequence different from the described method and/or components such as systems, structures, devices, circuits, etc. are combined or connected differently from the described method, or replaced with other components or equivalents, an appropriate result may be achieved.

Therefore, other implementations, other embodiments, and equivalents to the claims may also fall within the scope of the claims provided below.

The methods according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. Further, examples of the program instructions include machine language code created by a compiler and high-level language code executable by a computer using an interpreter. The foregoing hardware device may be configured to be operated as at least one software module to perform an operation of the embodiments, or vice versa.

While the embodiments have been described in connection with specific examples and drawings, it would be understood by a person skilled in the art that various modifications and changes may be possible from the foregoing disclosure. For example, even when described techniques are performed in a sequence different from the described method and/or components such as systems, structures, devices, circuits, etc. are combined or connected differently from the described method, or replaced with other components or equivalents, an appropriate result may be achieved.

While the disclosure has been particularly shown and described with reference to embodiments thereof, it will be understood that various changes in form and details may be made therein without departing from the spirit and scope of the following claims.

What is claimed is:

1. A method of determining a path, performed by a path determining apparatus in a first vehicle, the method comprising:
    receiving, via a first receiver and a second receiver, a first radio frequency (RF) signal of a first front vehicle and a second RF signal of a second front vehicle;
    determining a first position of the first front vehicle based on a first time required for the first RF signal to arrive at the first receiver, a second time required for the first RF signal to arrive at the second receiver and a transmission speed of the first RF signal, and a second position of the second front vehicle based on a third time required for the second RF signal to arrive at the first receiver, a fourth time required for the second RF signal to arrive at the second receiver and a transmission speed of the second RF signal;
    determining the first front vehicle as a target vehicle if the first position is closer to the first vehicle than the second position; and
    determining the path of the first vehicle based on the determined first position of the target vehicle.

2. The method of claim 1, wherein the path determining apparatus comprises the first receiver and the second receiver, and
    wherein the determining of the first position of the first front vehicle comprises:
    calculating a difference between a first distance between the first front vehicle and the first receiver in the first vehicle and a second distance between the first front vehicle and the second receiver in the first vehicle, based on the first time required for the first RF signal to arrive at the first receiver, the second time required for the first RF signal to arrive at the second receiver and the transmission speed of the first RF signal;
    calculating an azimuth between the first front vehicle corresponding to the received first RF signal and the first vehicle, based on the difference between the first distance and the second distance and a third distance between the first receiver and the second receiver; and
    calculating the position of the first front vehicle corresponding to the received first RF signal, based on the difference between the first distance and the second distance and the azimuth.

3. The method of claim 1, wherein the determining of the first front vehicle to be the target vehicle comprises determining the first front vehicle by using at least one of position of a plurality of front vehicles and path information of the plurality of front vehicles.

4. The method of claim 3, further comprising obtaining the path information of the plurality of front vehicles.

5. The method of claim 3, wherein the path information of the plurality of front vehicles comprises at least one of final destinations, intermediate pathways, intermediate stops, or traveling directions of the front vehicles.

6. The method of claim 3, further comprising obtaining consent to tracking from the determined first front vehicle.

7. The method of claim 6, further comprising requesting the first front vehicle from which the consent is obtained to transmit a predefined RF signal, which is the first RF signal, when the consent to the tracking is obtained.

8. The method of claim 6, further comprising determining the second front vehicle from among the plurality of front vehicles other than the determined first front vehicle when the consent to the tracking is not obtained.

9. The method of claim 3, further comprising obtaining consent to tracking from the plurality of front vehicles.

10. The method of claim 3, wherein each of the plurality of front vehicles comprises a transmitter and transmits an RF signal predefined corresponding to each of the plurality of front vehicles through the transmitter.

11. The method of claim 1, further comprising outputting the path of the first front vehicle.

12. A non-transitory computer readable medium having stored thereon a computer program to execute the method according to claim 1.

13. An apparatus in a first vehicle for determining a path of the first vehicle, the apparatus comprising:
a first receiver and a second receiver configured to receive a first radio frequency (RF) signal of a first front vehicle and a second RF signal of a second front vehicle; and
a processor configured to determine a first position of the first front vehicle based on the based on a first time required for the first RF signal to arrive at the first receiver, a second time required for the first RF signal to arrive at the second receiver and a transmission speed of the first RF signal, and a second position of the second front vehicle based on a third time required for the second RF signal to arrive at the first receiver, a fourth time required for the second RF signal to arrive at the second receiver and a transmission speed of the second RF signal, determine the first front vehicle as a target vehicle if the first position is closer to the first vehicle than the second position, and determine the path of the first vehicle based on the determined first position of the target vehicle.

14. The apparatus of claim 13,
wherein the processor is further configured to:
calculate a difference between a first distance between the first front vehicle and the first receiver in the first vehicle and a second distance between the first front vehicle and the second receiver in the first vehicle, based on the first time required for the first RF signal to arrive at the first receiver, the second time required for the first RF signal to arrive at the second receiver and the transmission speed of the first RF signal;
calculate an azimuth between the first front vehicle corresponding to the received first RF signal and the first vehicle, based on the difference between the first distance and the second distance and a third distance between the first receiver and the second receiver; and
calculate the position of the first front vehicle corresponding to the received first RF signal, based on the difference between the first distance and the second distance and the azimuth.

15. The apparatus of claim 13, wherein the processor is further configured to determine the first front vehicle to be the target vehicle for determining the path of the first vehicle from among a plurality of front vehicles, and
the first receiver and the second receiver are further configured to receive the first RF signal from the determined first front vehicle.

16. The apparatus of claim 15, wherein the processor is further configured to determine the first front vehicle by using at least one of position of the plurality of front vehicles and path information of the plurality of front vehicles.

* * * * *